United States Patent
Lim

(10) Patent No.: US 6,922,572 B2
(45) Date of Patent: Jul. 26, 2005

(54) APPARATUS AND METHOD FOR MONITORING AN EARMICROPHONE STATE IN A COMMUNICATION TERMINAL

(75) Inventor: Heui-Do Lim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 439 days.

(21) Appl. No.: 10/279,945

(22) Filed: Oct. 24, 2002

(65) Prior Publication Data

US 2003/0139204 A1 Jul. 24, 2003

(30) Foreign Application Priority Data

Oct. 24, 2001 (KR) ........................................ 2001-65814

(51) Int. Cl.[7] ................................................ H04B 1/38
(52) U.S. Cl. .................... 455/570; 455/575.2; 381/94.5
(58) Field of Search ................................ 455/565, 564, 455/569.1, 570, 575.2; 381/77, 94.5

(56) References Cited

U.S. PATENT DOCUMENTS

| | | | | | |
|---|---|---|---|---|---|
| 5,448,477 | A | * | 9/1995 | Delatorre et al. | 702/6 |
| 5,619,684 | A | * | 4/1997 | Goodwin et al. | 710/62 |
| 5,638,343 | A | * | 6/1997 | Ticknor | 369/4 |
| 5,978,689 | A | * | 11/1999 | Tuoriniemi et al. | 455/569.1 |
| 6,002,558 | A | * | 12/1999 | Rines et al. | 360/137 |
| 6,263,218 | B1 | * | 7/2001 | Kita | 455/567 |
| 6,397,087 | B1 | * | 5/2002 | Kim et al. | 455/569.1 |
| 6,473,629 | B1 | * | 10/2002 | Chang | 455/566 |
| 6,500,006 | B2 | * | 12/2002 | Wakamoto | 434/156 |
| 6,594,363 | B1 | * | 7/2003 | Kim | 381/58 |
| 6,690,793 | B1 | * | 2/2004 | King | 379/421 |
| 6,812,954 | B1 | * | 11/2004 | Priestman et al. | 348/14.01 |
| 2002/0010005 | A1 | * | 1/2002 | Hwang et al. | 455/563 |
| 2002/0016188 | A1 | * | 2/2002 | Kashiwamura | 455/568 |
| 2002/0021800 | A1 | * | 2/2002 | Bodley et al. | 379/430 |
| 2003/0052964 | A1 | * | 3/2003 | Priestman et al. | 348/14.02 |
| 2003/0100331 | A1 | * | 5/2003 | Dress et al. | 455/550 |
| 2003/0165237 | A1 | * | 9/2003 | Farr et al. | 379/430 |
| 2004/0077382 | A1 | * | 4/2004 | Verity | 455/569.1 |
| 2004/0209649 | A1 | * | 10/2004 | Lord | 455/558 |

* cited by examiner

Primary Examiner—W. R. Young
Assistant Examiner—Dai Phuong
(74) Attorney, Agent, or Firm—Dilworth & Barrese, LLP

(57) ABSTRACT

An apparatus and method for correctly sensing the state of a 4-pole earmicrophone having two receiver terminals and two common terminals for a microphone and a switch in a mobile terminal. The mobile terminal senses a switch-on of the earmicrophone by mechanical connection between an earmicrophone jack and a jack connector during an earmicrophone connection. The mobile terminal stores information about an earmicrophone state detected by the jack connector. Upon detection of the switch-on of the earmicrophone, the mobile terminal reads the earmicrophone state information from the memory. If the read earmicrophone state indicates earmicrophone disconnection, the mobile terminal mutes transmission and reception, determining that the switch-on is a transient phenomenon.

7 Claims, 9 Drawing Sheets

APPARATUS AND METHOD FOR MONITORING AN EARMICROPHONE STATE IN A COMMUNICATION TERMINAL

PRIORITY

This application claims priority to an application entitled "Apparatus and Method for Monitoring Earmicrophone State in a Communication Terminal" filed in the Korean Industrial Property Office on Oct. 24, 2001 and assigned Serial No. 2001-65814, the contents of which are hereby incorporated by reference.

BACKGROUND OF THE INVENTION

1. Field of the Invention

The present invention relates generally to a communication terminal, and in particular, to an apparatus and method for correctly sensing a state of a 4-pole earmicrophone in a communication terminal.

2. Description of the Related Art

Commonly, a portable terminal uses a 3-pole earmicrophone or a 4-pole earmicrophone. The 4-pole earmicrophone is connected to a communication terminal with a 4-pole jack including two receiver terminals and two common terminals for both a microphone (MIC) and a switch.

FIG. 1 illustrates a structure of a 4-pole earmicrophone jack. As illustrated in FIG. 1, the jack includes four terminals, i.e., two receiver terminals and two common terminals for a microphone and a switch.

Circuit operations according to earmicrophone states will be described below with reference to FIGS. 2 to 5.

FIG. 2 is a circuit diagram of a jack connector by which the earmicrophone is connected to a communication terminal. FIG. 3 is an equivalent circuit diagram of the jack connector when an earmicrophone is not connected. FIG. 4 is an equivalent circuit diagram of the jack connector when an earmicrophone is connected. FIG. 5 is an equivalent circuit diagram of the jack connector when a switch is turned on with an earmicrophone connected.

Basically, the jack connector is configured to sense an earmicrophone jack connection by its mechanical connection to an earmicrophone jack, and a switch-on of the earmicrophone as illustrated in FIG. 2. Upon detection of the jack connection, the jack connection outputs a high signal through a jack detection terminal, and upon detection of the switch-on, the jack connection outputs a high signal through a switch detection terminal.

A description will first be made of an equivalent circuit of the jack connector illustrated in FIG. 2 when the earmicrophone is not connected, which is illustrated in FIG. 3. Referring to FIG. 3, when the earmicrophone is disconnected in FIG. 2, audio signals are exchanged between a microphone, a receiver and a voice processor such as a DSP (Digital Signal Processor) in the communication terminal. Here, the audio signals pass through terminals 1, 2, 5 and 6 in FIG. 2. A voltage 0.21V (=VCC×(R3/R1+R2+R3)=0.07× 3V) is applied between a second resistor with a resistance R2 and a third resistor with a resistance R3. As a result, no currents flow through the bases of first and second transistors TR1 and TR2 and thus the first and second transistors TR1 and TR2 do not turn on. Consequently, the jack detection terminal and the switch detection terminal output low signals to a controller in the communication terminal (not shown). The controller senses earmicrophone disconnection and switch-off by the detection signals.

Referring to an equivalent circuit of the jack connector illustrated in FIG. 2 during an earmicrophone connection, i.e., if the earmicrophone is inserted into the communication terminal, a mechanical contact terminal detaches a terminal 3 from the terminal 2 and the terminal 5 from a terminal 4. Instead, the microphone and receiver of the earmicrophone are connected to the terminals 1, 2, 5 and 6. Therefore, audio signals are exchanged between the microphone and receiver of the earmicrophone and the voice processor of the communication terminal via the terminals 1, 2 5 and 6, with the microphone and receiver of the communication terminal disabled.

Referring to FIG. 4, the resistance between the base of the first transistor TR1 and a power supply for supplying a power voltage VCC is 16.5KΩ(=R1+R2+R4). As a result, the first transistor TR1 is turned on and thus a high signal is output through the jack detection terminal. Meanwhile, a voltage of 0.21V (=VCC×(R3/(R1+R10+R3))=0.7×3V) is applied between a resistor R10 with a resistance of 6K and the third resistor R3, no current flows through the base of the second transistor TR2. That is, the second transistor TR2 is disabled and thus a low signal is output through the switch detection terminal. Therefore, the controller of the communication terminal senses an earmicrophone connection and a switch-off by the high jack detection signal and the low switch detection signal.

FIG. 5, is an equivalent circuit of the jack connector illustrated in FIG. 2 during an earmicrophone connection and a switch-on, since the first resistor R1, second resistor R2 and fourth resistor R4 with the resistances 500, 6K and 10K (16.5KΩ(=R1+R2+R4) in total) are connected between the base of the first transistor TR1 and the power supply, the first transistor TR1 is turned on and a high signal is output through the jack detection terminal. A voltage of 1.5V (=VCC×(R3/(R1+R3)=0.5×3V) is applied between the first and third resistors R1 and R3, and current flows through the base of the second transistor TR2. That is, the transistor TR2 is turned on and a high signal is output through the switch detection terminal. Therefore, the controller of the communication terminal senses a switch-on with the earmicrophone connected by the two high detection signals.

The jack connector illustrated in FIGS. 2 to 5 corresponds to a microphone circuit connected to the microphone of the communication terminal. In other words, a communication terminal using a 4-pole earmicrophone senses earmicrophone states by setting a different voltage difference for each earmicrophone state using the bias voltage of the microphone circuit.

Table 1 and Table 2 below define earmicrophone states depending on jack detection signals and switch detection signals in combination. Table 1 illustrates state transition when the communication terminal is turned on and then the earmicrophone is inserted into the communication terminal, and Table 2 illustrates state transition when the terminal is turned on with the earmicrophone inserted. In Table 1 and Table 2, [*, #] indicates a combination of two detection signals, with * representing a jack detection signal and # representing a switch detection signal.

TABLE 1

| state (1, 1) before earmicrophone connection | state (1, 2) after earmicrophone connection | state (1, 3) switch-on | state (1, 4) switch-off | state (1,5) earmicrophone disconnection |
|---|---|---|---|---|
| [0, 0] | [1, 0] | [1, 1] | [1, 0] | [0, 0] |

TABLE 2

| state (1, 6) power-on with earmicrophone connected | state (1, 3) switch-on | state (1, 4) switch-off | state (1, 5) earmicrophone disconnection |
|---|---|---|---|
| [1, 0] | [1, 1] | [1, 0] | [0, 0] |

FIG. 6 is an equivalent circuit diagram of the jack connector illustrated in FIG. 2 during connection or disconnection of the earmicrophone jack illustrated in FIG. 1 to or from the jack connector. In the equivalent circuit diagram, the terminals 1, 4, and 5 are connected to one another.

Referring to FIG. 6, a voltage of 1.5V (=VCC×(R3/(R1+R3))=0.5×3V) is applied between the first and third resistors R1 and R3. As a result, current flows through the base of the first transistor TR1 and thus the first transistor TR1 is turned on, with a high signal output through the jack detection terminal. At the same time, current flows through the base of the second transistor TR2. That is, the transistor TR2 is turned on and a high signal is output through the switch detection terminal as illustrated in FIG. 5. In other words, since high signals are output through the two detection terminals, the controller of the communication terminal determines that a user has turned on the switch with the earmicrophone connected. In this case, the controller incorrectly senses pressing of a SEND button and thus automatically dials the latest called phone number.

FIG. 7 is a flowchart illustrating a conventional terminal operation during an earmicrophone connection. Referring to FIG. 7, the communication terminal is placed in an earmicrophone disconnection state represented as [0, 0] in step 701. This indicates that both the jack detection signal and the switch detection signal are low. When the jack is connected in step 703, the jack connector outputs a high jack detection signal and a high switch detection signal to the controller in step 705. In step 707, the controller misjudges that the switch is turned on with the earmicrophone connected by sensing the two high detection signals. While this occurs instantaneously in the process of connecting the earmicrophone, the controller performs a switch-on activated operation. That is, the controller displays the latest called phone number stored in a memory on an LCD (Liquid Crystal Display) or automatically dials the phone number as long as the switch detection signal is high in step 709.

As described above, an unintended operation such as displaying a phone number or automatically dialing occurs during an earmicrophone jack connection in the conventional communication terminal using a 4-pole earmicrophone.

SUMMARY OF THE INVENTION

It is, therefore, an object of the present invention to provide an apparatus and method for preventing a communication terminal from malfunctioning during an earmicrophone jack connection in the communication terminal.

It is another object of the present invention to provide an apparatus and method for sensing a switch-on of an earmicrophone in a real earmicrophone connected state in a communication terminal.

It is a further object of the present invention to provide an apparatus and method for sensing a switch-on of an earmicrophone according to a jack connection detection signal and a switch-on detection signal in a real earmicrophone connected state in a communication terminal.

The foregoing and other objects are achieved by providing an apparatus and method for correctly sensing the state of a 4-pole earmicrophone having two receiver terminals and two common terminals for a microphone and a switch in a mobile terminal. The mobile terminal senses a switch-on of the earmicrophone by mechanical connection between an earmicrophone jack and a jack connector during an earmicrophone connection.

In the earmicrophone state sensing method, information about an earmicrophone state detected by the jack connector is stored in a memory. Upon detection of the switch-on of the earmicrophone, the earmicrophone state information is read from the memory. If the read earmicrophone state indicates earmicrophone disconnection, transmission and reception is muted, determining that the switch-on is a transient phenomenon.

In the earmicrophone state sensing apparatus, the jack connector detects an earmicrophone state and a switch state, a memory memorizes the earmicrophone state, and a controller reads the earmicrophone state information from the memory upon detection of the switch-on of the earmicrophone through the jack connector, and the controller then mutes transmission and reception determining that the switch-on is a transient phenomenon, if the read earmicrophone state indicates earmicrophone disconnection.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Before describing the present invention, it should be made clear that polling or interrupt techniques are used to sense a jack detection signal indicating whether an earmicrophone jack is connected and a switch detection signal indicating whether a SEND button is pressed. The detection signals are set to be low during an earmicrophone disconnection and switch-off, and to be high during an earmicrophone connection and switch-on. A combination of the detection signals will be expressed as [earmicrophone state, switch state]. Hence earmicrophone disconnection is represented as [0, 0], earmicrophone connection is represented as [1, 0], and switch-on with the earmicrophone connected is represented as [1, 1].

Figure 1:
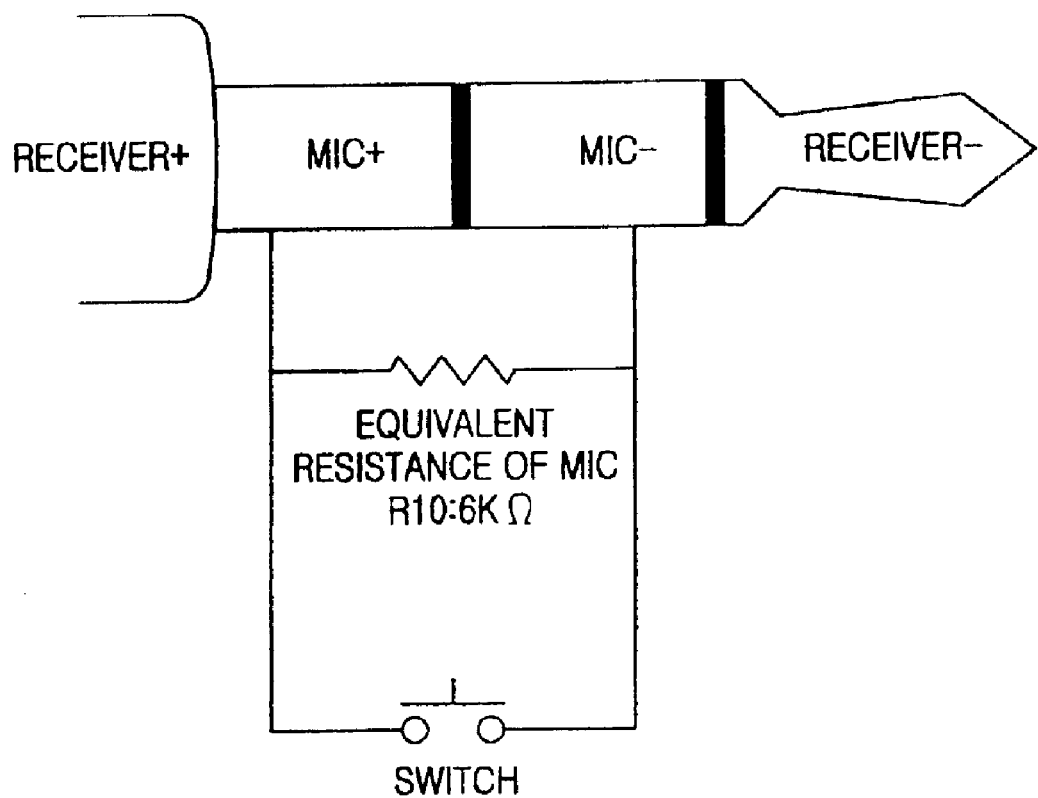
FIG. 1 illustrates a structure of an earmicrophone.
Figure 2:
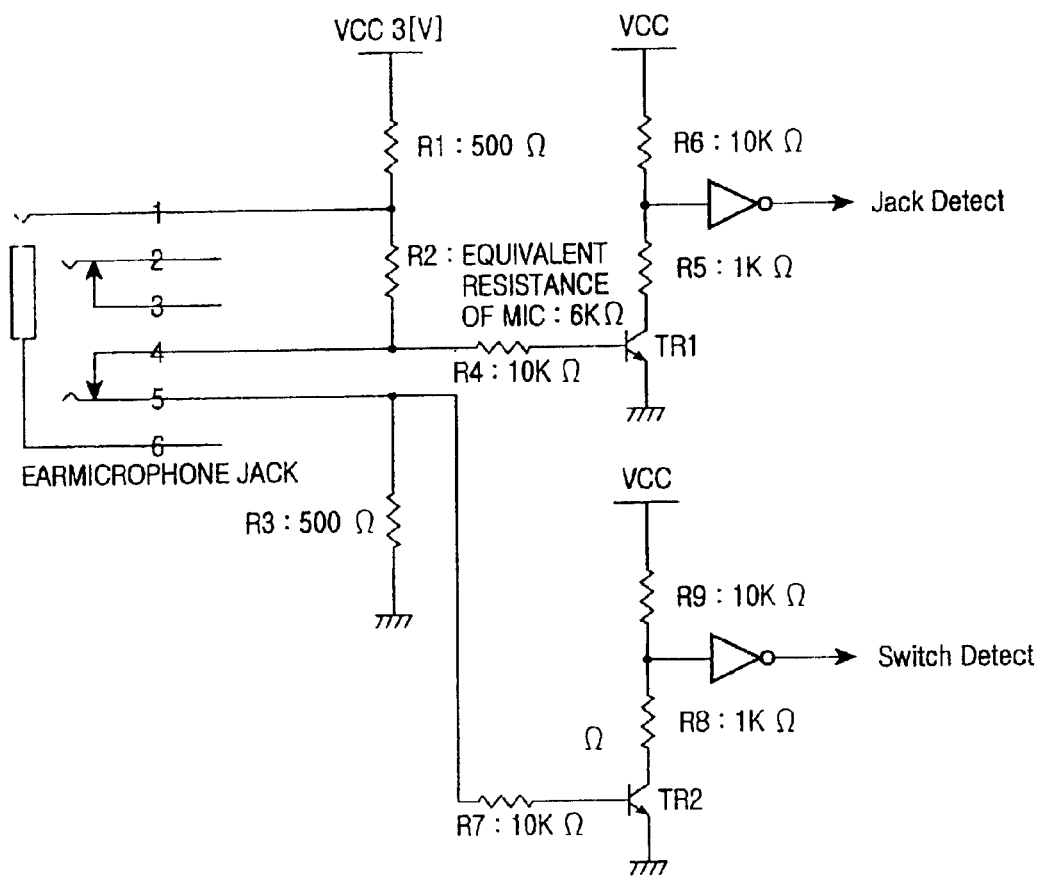
FIG. 2 is a detailed circuit diagram of a jack connector to which the earmicrophone is connected.
Figure 3:
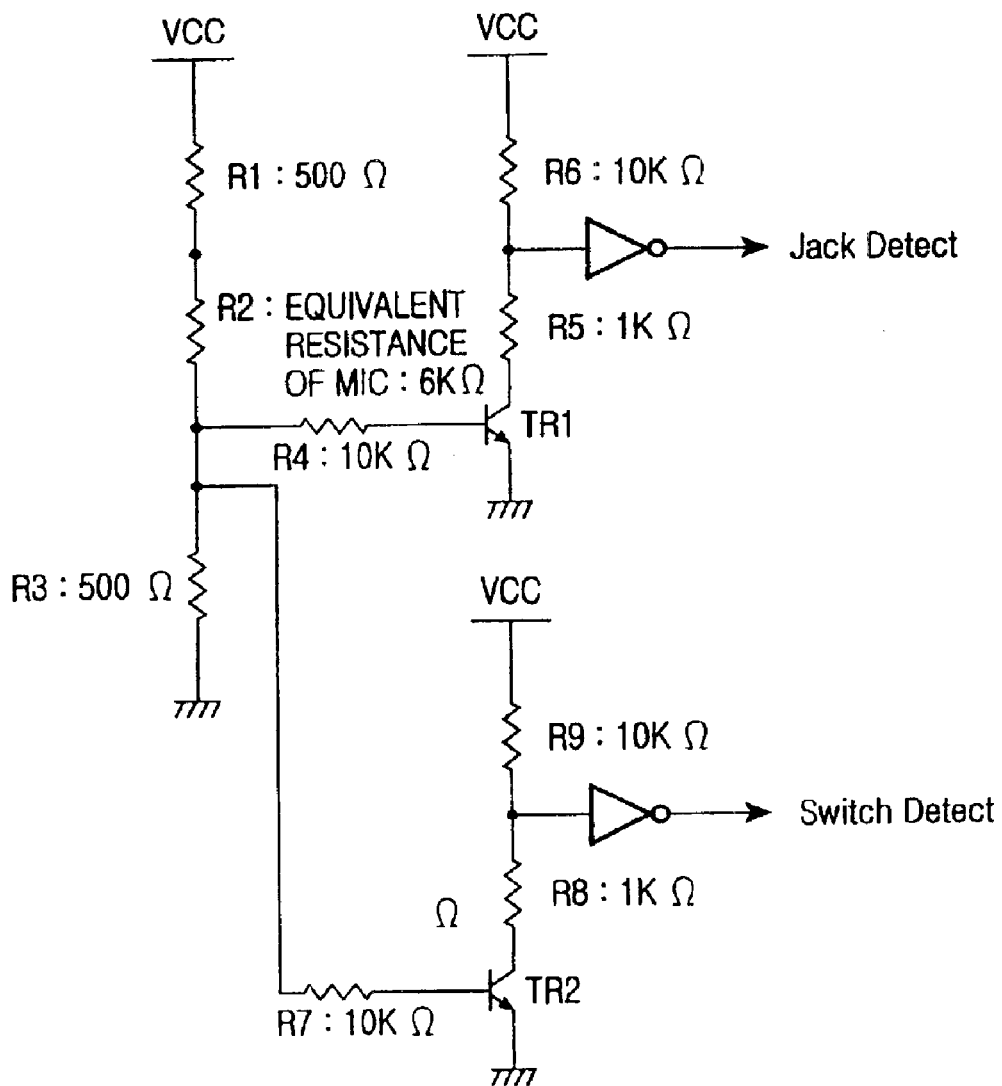
FIG. 3 is an equivalent circuit diagram of the jack connector illustrated in FIG. 2 during an earmicrophone disconnection.
Figure 4:
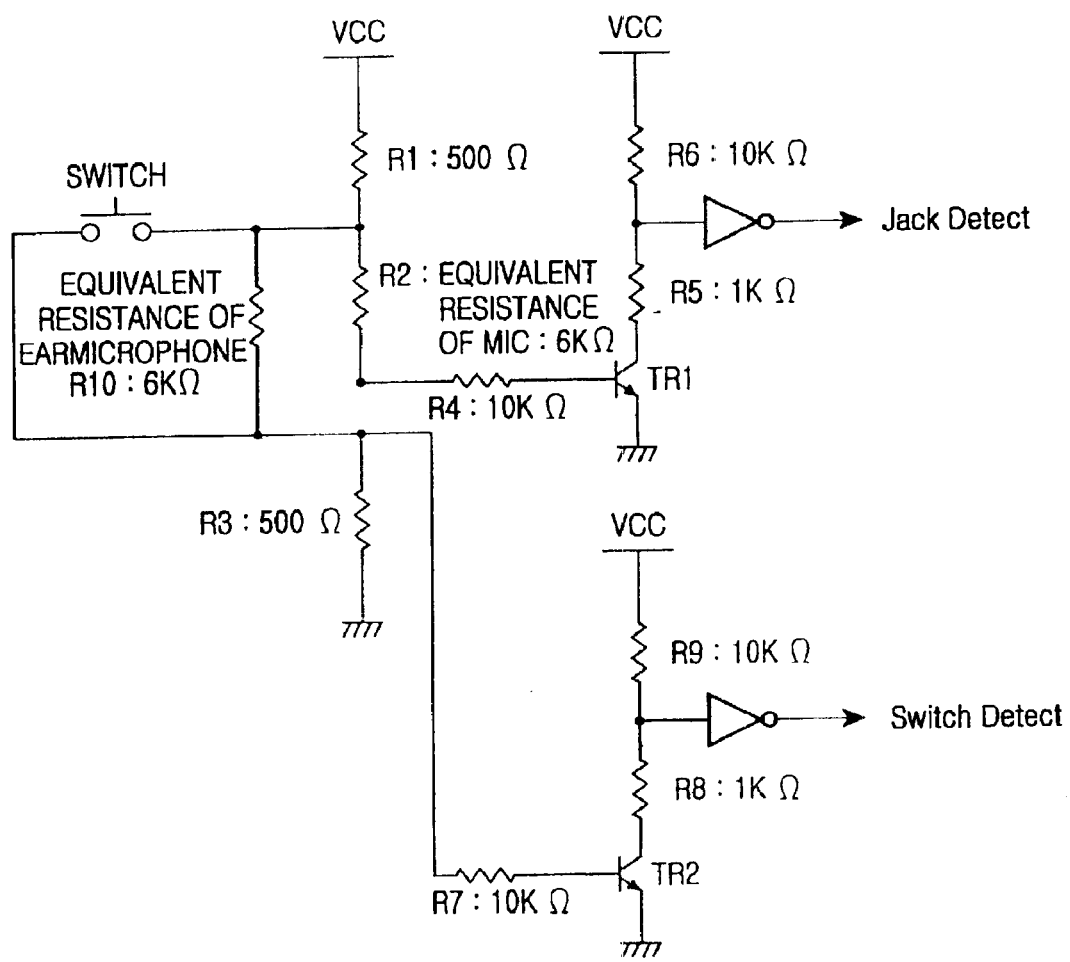
FIG. 4 is an equivalent circuit diagram of the jack connector illustrated in FIG. 2 during an earmicrophone connection.
Figure 5:
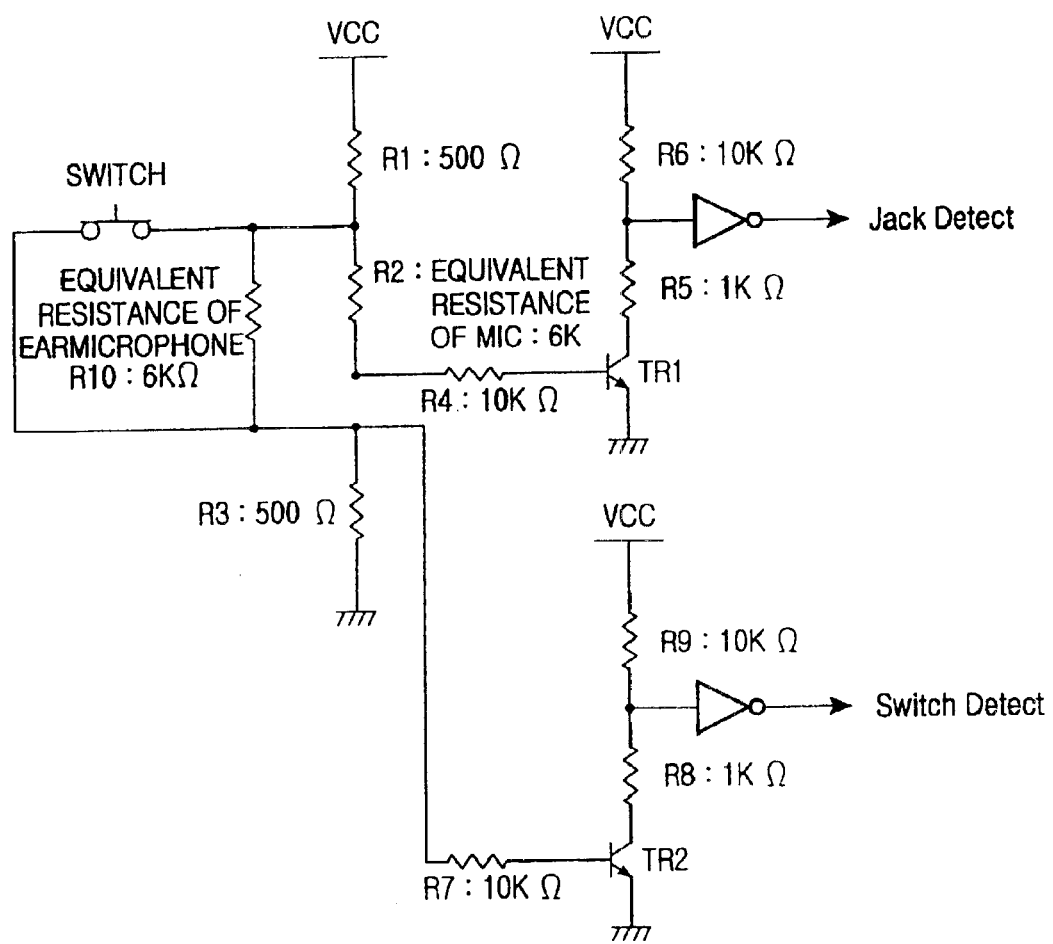
FIG. 5 is an equivalent circuit diagram of the jack connector illustrated in FIG. 2 during a switch-on with the earmicrophone connected.
Figure 6:
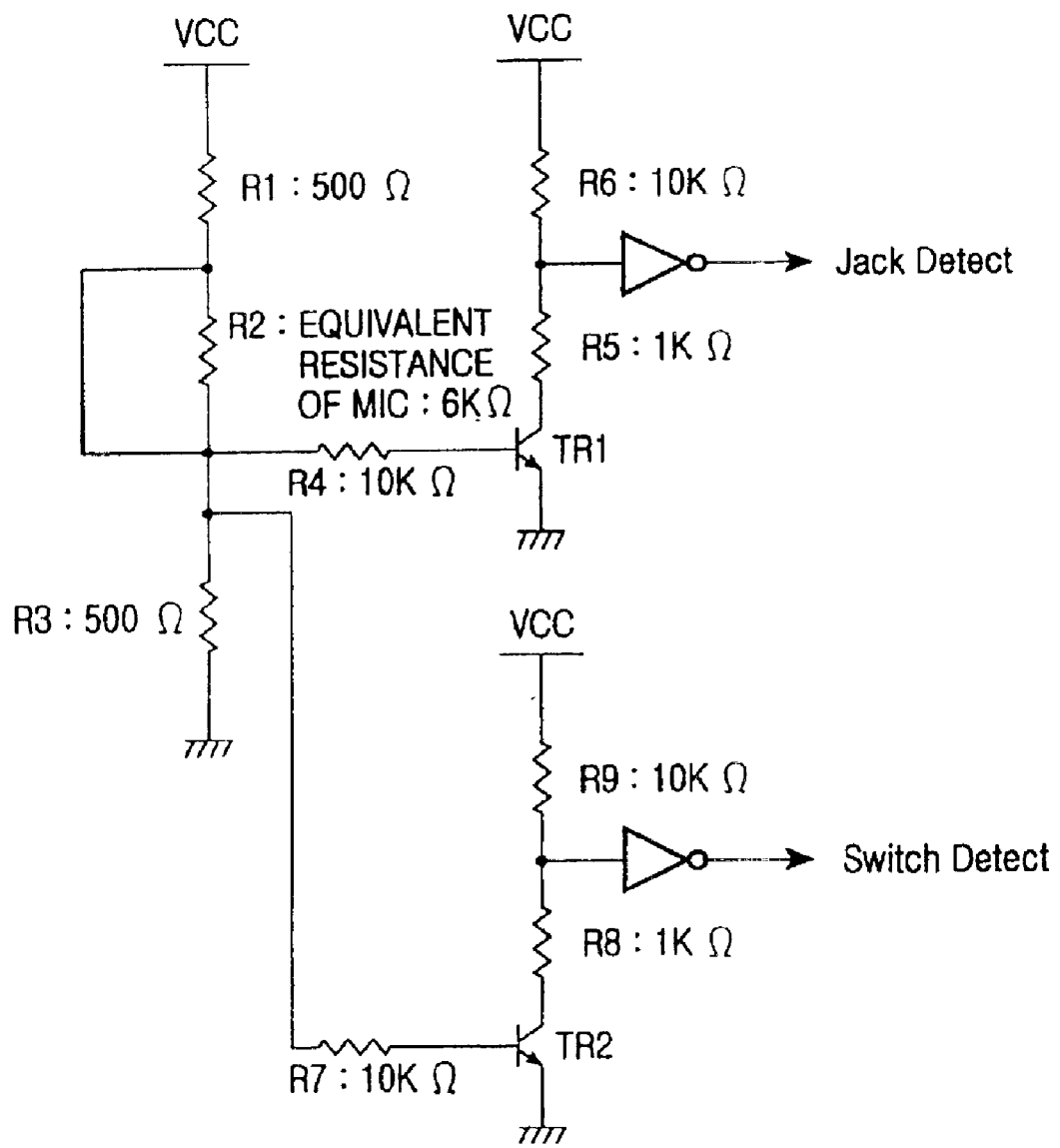
FIG. 6 is an equivalent circuit diagram of the jack connector illustrated in FIG. 2 during a connecting or disconnecting the earmicrophone.
Figure 7:
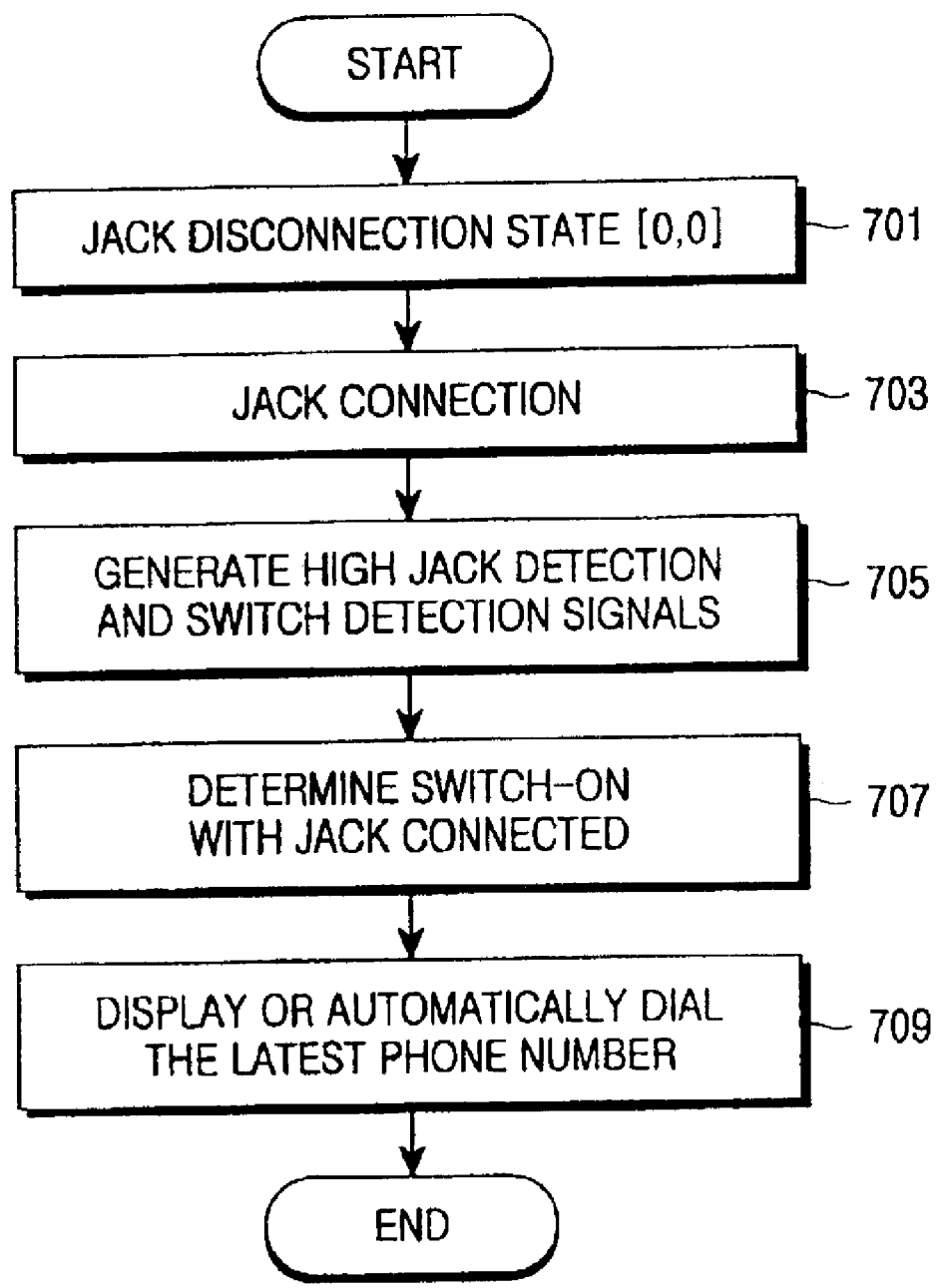
FIG. 7 is a flowchart illustrating a conventional terminal operation during an earmicrophone connection to a terminal.

If an earmicrophone is connected to a communication terminal with an earmicrophone jack, the terminals 1, 4 and 5 are connected to one another as illustrated in FIG. 2 and the earmicrophone state is transitioned from [0, 0] to [1, 1]. In this case, despite a switch-off, a switch-on is incorrectly sensed. In the present invention, therefore, transition of the [earmicrophone state, switch state] to [1, 0] is monitored and it is determined that the subsequent states are valid. For example, when the earmicrophone is connected and the switch is turned on, the earmicrophone state changes to [0, 0], [1, 1], [1, 0] and [1, 1] in this order. At the third state, the earmicrophone is actually connected and so it is determined that at the fourth state [1, 1], the switch is pressed with the earmicrophone connected. The second state [1, 1] is a transient phenomenon that appears in the course of connecting the earmicrophone to the communication terminal.

Earmicrophone states defined in the present invention are illustrated in Table 3 and Table 4. Table 3 illustrates state transition when the earmicrophone is connected after power-on of the terminal, and Table 4 illustrates state transition in the case of power-on with the earmicrophone connected.

on with the earmicrophone connected or the switch-on is a transient during an earmicrophone connection, by checking the previous earmicrophone state. In the latter case, the controller 811 operates to prevent switch-on-activated operations like automatic dialing. Also, the controller 811 mutes audio transmission/reception so that noise involved with earmicrophone connection is not audible to both a caller and a called party.

A memory 812 includes a program memory, a data memory and a non-volatile memory. The program memory stores programs necessary to control the overall operation of the communication terminal. The program memory can be a flash memory. The data memory functions to temporarily store data generated during the operation of the mobile terminal. A RAM (Random Access memory) can be used as the data memory. The non-volatile memory stores phone numbers registered for short dialing and system parameters. An EEPROM (Electrically Erasable Programmable Read Only Memory) can be used as the non-volatile memory. A keypad 816 generates command key signals to control the operation of the controller 811 and key signals for data input. A display 819 displays the operational state of the mobile terminal on an LCD under the control of the controller 811.

An RF (Radio Frequency) module 814 converts an RF signal received via an antenna to a baseband signal and feeds it to a MODEM 815. The RF module 814 also converts a baseband signal received from the MODEM 815 to an RF signal and transmits it via the antenna. The MODEM 815 subjects the baseband signal received from the RF module 814 to despreading and channel decoding, transmits the resulting source data to the controller 811, subjects source data received from the controller 811 to channel coding and spreading, and transmits the spread signal to the RF module 814.

A voice processor 817 processes voice data received from the controller 811 to a voice signal and outputs the voice signal through a speaker SPK, and converts a voice signal

TABLE 3

| state (2, 1) before earmicrophone connection | state (2, 2) during earmicrophone connection | state (2, 3) after earmicrophone connection | state (2, 4) switch-on | state (2, 5) switch-off | state (2, 6) during earmicrophone disconnection | state (2, 7) after earmicrophone disconnection |
|---|---|---|---|---|---|---|
| [0, 0] | [1, 1] | [1, 0] | [1, 1] | [1, 0] | [1, 1] | [0, 0] |

TABLE 4

| state (2, 3) earmicrophone connected | state (2, 4) switch on | state (2, 5) during earmicrophone disconnection | state (2, 7) after earmicrophone disconnection |
|---|---|---|---|
| [1, 0] | [1, 1] | [1, 1] | [0, 0] |

Figure 8:
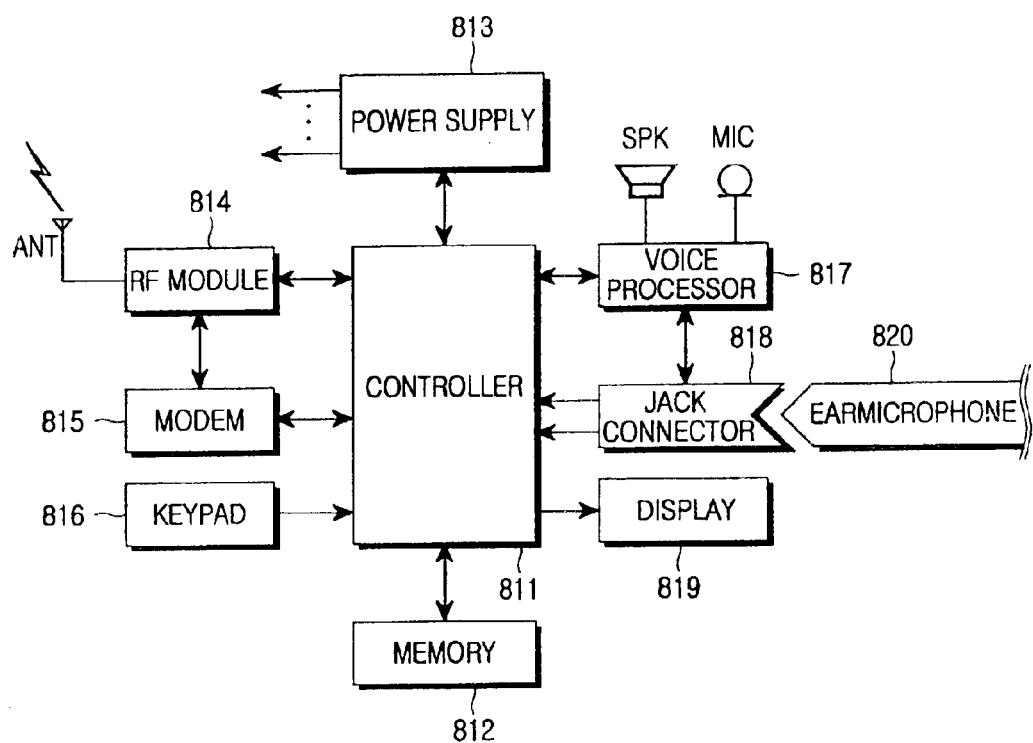
FIG. 8 is a block diagram of a communication terminal according to an embodiment of the present invention.

FIG. 8 is a block diagram of a mobile terminal according to an embodiment of the present invention. Referring to FIG. 8, a controller 811 provides overall control to the mobile terminal. In particular, the controller 811 monitors the above-described two detection signals and prevents malfunction of the mobile terminal during an earmicrophone jack connection. For example, the controller 811 memorizes the previous levels of the two detection signals, and upon detection of a switch-on, it determines whether the switch is received from a microphone MIC to digital data and transmits it to the controller 811. The voice processor 817 is, for example, a DSP. When talking over an earmicrophone 820, transmission and reception signals are fed to and output from the receiver and microphone of the earmicrophone 820 connected through a jack connector 818, instead of the speaker SPK and the microphone MIC of the terminal. The jack connector 818 outputs a jack detection signal to the controller 811 upon sensing connection of the earmicrophone 820 and outputs a switch detection signal to the controller 811 upon sensing switch-on of the earmicrophone 820.

The jack connector 818 is configured as illustrated in FIGS. 2 to 6, and in such a manner that malfunction of the terminal can be prevented during an earmicrophone jack connection using the two detection signals output from the jack connector 818.

The moment the earmicrophone jack is connected to the terminal, the head of the earmicrophone connects the terminals 1, 4, and 5 and induces a high voltage to the terminals 4 and 5, thereby outputting high signals through the jack detection terminal and the switch detection terminal. Upon sensing the two detection signals, the controller 811 checks the stored previous detection signal levels. If both are low, the controller 811 controls not to perform phone number displaying or automatic dialing, determining that the current earmicrophone state is transient in the course of earmicrophone jack connection. For example, if the earmicrophone is connected to the terminal with a call in progress, noise is delivered to a caller and a called. To prevent the noise delivery, audio transmission and reception are muted temporarily until the jack connection is completed.

Figure 9:
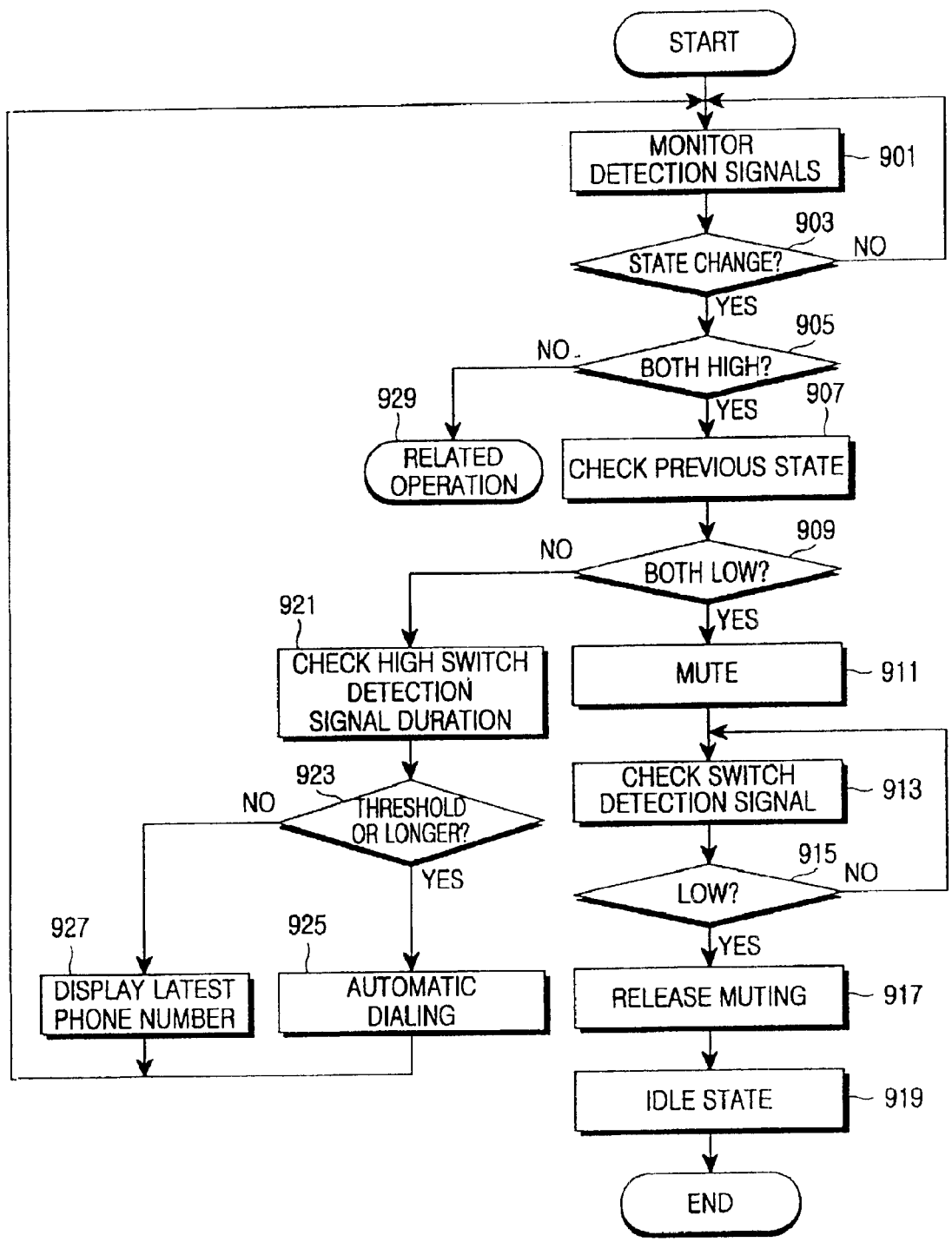
FIG. 9 is a flowchart illustrating a control operation for preventing malfunction of the communication terminal during an earmicrophone connection according to the embodiment of the present invention.

FIG. 9 is a flowchart illustrating a control operation for preventing malfunction of the terminal during an earmicrophone connection according to the embodiment of the present invention. Referring to FIG. 9, the controller 811 monitors a jack detection signal and a switch detection signal through the jack connector 818 in step 901 and determines whether at least one of the two detection signals is changed in level in step 903. If a change is sensed in the detection signals, the controller 811 goes to step 905 and if the detection signal levels are kept unchanged, the controller 911 returns to step 901.

In step 905, the controller 811 determines whether both the detection signals are high. If they are, the controller 811 goes to step 907 and if at least one of them is low, the controller 811 performs an operation related with the changed state in step 929.

In step 907, the controller 811 reads the previous two detection signal levels from the memory 812. The controller 811 determines whether both of the previous detection signal levels are low in step 909. If both are low, the controller 811 goes to step 911 and otherwise, it goes to step 921.

If both the previous detection signals are low, the controller 811 mutes audio transmission and reception in step 911. This is done by controlling a power supply 813 to block a power voltage from being fed to the RF module 814 or setting the gains of gain controllers for both transmission and reception to 0. Alternatively, the transmission and reception signals are muted by use of a switch in the RF module 814.

The reason for the muting is to prevent noise generated during earmicrophone connection from being delivered to a caller and a called party, and to prevent automatic dialing or display of the latest called phone number due to malfunction of the terminal generated during the earmicrophone connection. In other words, even if the two detection signals are sensed to be high in step 905 and thus a call origination message is generated in a high layer by automatic dialing, the call origination message is blocked from being sent to a base station by muted transmission and reception in a physical layer. Thus, automatic dialing is prevented.

In step 913, the controller 811 checks the switch detection signal. If the earmicrophone jack is completely connected, the switch detection signal is low. That is, the controller 811 determines whether the switch detection signal is low in step 915. If the switch detection signal is low, the controller 811 goes to step 917 and otherwise, it returns to step 913. In step 917, the controller 811 releases the audio transmission and reception from the muted state, determining that the earmicrophone is completely connected. The controller 811 enters an idle state in step 919.

Meanwhile, if both the previous detection signals are not low in step 909, the controller 811 checks the duration for which the switch detection signal is high, determining that the switch is turned on in step 921. The controller 811 determines whether the duration is a threshold or longer in step 923. If it is, the controller 811 automatically dials the latest called phone number in step 925 and otherwise, the controller 811 displays the latest phone number on the LCD in step 927.

While the previous earmicrophone state is refereed to at the current [1, 1] state and it is determined whether the [1, 1] state is valid in the above-described embodiment of the present invention, it can also be contemplated that a predetermined flag is set at an initial [1, 0] state and it is determined whether the [1, 1] state is valid by checking the flag at the [1, 1] state.

Similarly to the case of earmicrophone connection, if the earmicrophone state is [1, 1] in removing the earmicrophone and pressing the switch, audio transmission and reception are muted not to deliver noise to a caller and a called party. That is, by monitoring earmicrophone state transition, the current earmicrophone state is correctly determined.

As described above, the present invention advantageously prevents malfunction of a communication terminal like automatic dialing to the last called phone number due to high jack detection and switch detection signals during earmicrophone connection in the communication terminal using a 4-pole earmicrophone. Therefore, malfunction-caused battery consumption is prevented and user reliability of the communication terminal is increased.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of correctly sensing a state of a 4-pole earmicrophone having two receiver terminals and two common terminals for a microphone and a switch in a mobile terminal that senses a switch-on of the earmicrophone by mechanical connection between an earmicrophone jack and a connection terminal of a jack connector during an earmicrophone connection, the method comprising the steps of:

storing information about an earmicrophone state detected by the jack connector in a memory;

reading the earmicrophone state information from the memory upon detection of the switch-on of the earmicrophone through the jack connector; and muting transmission and reception, determining that the switch-on is a transient phenomenon, if the read earmicrophone state indicates an earmicrophone disconnection.

2. The method of claim 1, further comprising the step of releasing the muting if a switch-off is sensed after the muting step.

3. A method of correctly sensing a state of a 4-pole earmicrophone having two receiver terminals and two common terminals for a microphone and a switch in a mobile terminal that senses a switch-on of the earmicrophone by mechanical connection between an earmicrophone jack and a connection terminal of a jack connector during an earmicrophone connection, the method comprising the steps of:

storing information about an earmicrophone state detected by the jack connector in a memory;

reading the earmicrophone state information from the memory upon detection of the switch-on of the earmicrophone through the jack connector; and preventing switch-on-activated automatic dialing, determining that the switch-on is a transient phenomenon, if the read earmicrophone state indicates an earmicrophone disconnection.

4. A method of correctly sensing a state of an earmicrophone in a mobile terminal that has a jack connection terminal for detecting earmicrophone connection and a switch detection terminal for detecting a switch-on of the earmicrophone and senses the switch-on of the earmicrophone by high outputs of the jack connection terminal and the switch detection terminal during an earmicrophone connection, the method comprising the steps of:

determining whether an earmicrophone state is changed by monitoring a jack connection signal and a switch detection signal output from the jack connection terminal and the switch detection terminal;

determining whether both the jack connection signal and the switch detection signal are high if the earmicrophone state is changed;

determining whether both the jack connection signal and the switch detection signal were low previously if both the jack connection signal and the switch detection signal are high; and muting audio transmission and reception if both the jack connection signal and the switch detection signal were low previously.

5. The method of claim 4, further comprising the steps of:

determining a duration for which the switch detection signal is high if both the jack connection signal and the switch detection signal were low previously;

automatically dialing a last called phone number if the duration is a predetermined threshold or longer; and displaying the last called phone number on a display if the duration is below the predetermined threshold.

6. The method of claim 4, further comprising the steps of:

determining whether the switch detection signal becomes low; and releasing the muting if the switch detection signal is low, after the muting step.

7. An apparatus for correctly sensing a state of a 4-pole earmicrophone having two receiver terminals and two common terminals for a microphone and a switch in a mobile terminal that senses a switch-on of the earmicrophone by mechanical connection between an earmicrophone jack and a connection terminal of a jack connector during an earmicrophone connection, the apparatus comprising:

the jack connector for detecting an earmicrophone state and a switch state;

a memory for memorizing the earmicrophone state; and a controller for reading the earmicrophone state information from the memory upon detection of the switch-on of the earmicrophone through the jack connector, and muting transmission and reception, determining that the switch-on is a transient phenomenon, if the read earmicrophone state indicates an earmicrophone disconnection.

* * * * *